(12) United States Patent
Schweitzer et al.

(10) Patent No.: US 11,427,032 B2
(45) Date of Patent: Aug. 30, 2022

(54) TIRE TREAD AND A TIRE COMPRISING A TREAD

(71) Applicant: THE GOODYEAR TIRE & RUBBER COMPANY, Akron, OH (US)

(72) Inventors: Claude Schweitzer, Colmar-Berg (LU); Jean-Louis Marie Felicien Thomas, Arlon (BE); Bodo Ahrens, Trier (DE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 119 days.

(21) Appl. No.: 16/992,297

(22) Filed: Aug. 13, 2020

(65) Prior Publication Data
US 2021/0046784 A1 Feb. 18, 2021

Related U.S. Application Data

(60) Provisional application No. 62/887,174, filed on Aug. 15, 2019.

(51) Int. Cl.
| | | |
|---|---|---|
| *B60C 11/13* | (2006.01) | |
| *B60C 11/00* | (2006.01) | |
| *B60C 11/04* | (2006.01) | |
| *B60C 11/03* | (2006.01) | |

(52) U.S. Cl.
CPC ........ *B60C 11/005* (2013.01); *B60C 11/0008* (2013.01); *B60C 11/042* (2013.01); *B60C 2011/0016* (2013.01); *B60C 2011/0341* (2013.01)

(58) Field of Classification Search
CPC . B60C 11/005; B60C 11/0008; B60C 11/042; B60C 2011/0016; B60C 2011/0341; B60C 11/1346; B60C 11/13; B60C 9/18
See application file for complete search history.

(56) References Cited

U.S. PATENT DOCUMENTS

| | | |
|---|---|---|
| 8,439,095 B2 | 5/2013 | Zhang et al. |
| 8,833,411 B2 | 9/2014 | Zhao |
| 8,919,404 B2 | 12/2014 | Schweitzer et al. |
| 9,545,823 B2 | 1/2017 | Zhao et al. |
| 9,623,707 B2 | 4/2017 | Schweitzer et al. |
| 9,757,986 B2 | 9/2017 | Zhao et al. |

(Continued)

*Primary Examiner* — Matthew J Daniels
*Assistant Examiner* — Shibin Liang
(74) *Attorney, Agent, or Firm* — Alvin T. Rockhill

(57) ABSTRACT

The present invention relates to a tire tread comprising a tread cap comprising at least one tread cap rubber compound, at least three circumferential grooves, wherein at least portions of the sidewalls and the bottom of each of said grooves are formed by a circumferential groove reinforcement, and wherein a first groove reinforcement of a groove laterally next to the equatorial plane of the tire comprises a first reinforcement rubber compound which has a higher hardness than the tread cap rubber compound, and wherein a second groove reinforcement of a groove with a larger lateral distance to the equatorial plane of the tire than the first groove, comprises a second reinforcement rubber compound which has a higher hardness than the tread cap rubber compound and a lower hardness than the second reinforcement rubber compound.

20 Claims, 3 Drawing Sheets

(56) References Cited

U.S. PATENT DOCUMENTS

| | | |
|---|---|---|
| 10,040,318 B2 | 8/2018 | Meza et al. |
| 10,427,463 B2 | 10/2019 | Schweitzer |
| 2009/0084477 A1 | 4/2009 | Sandstrom et al. |
| 2014/0069561 A1* | 3/2014 | Dermience ......... B60C 11/1353 152/209.18 |
| 2016/0059632 A1 | 3/2016 | Zhao et al. |
| 2016/0082774 A1 | 3/2016 | Zhao et al. |
| 2018/0134086 A1* | 5/2018 | Schweitzer ............... C08L 7/00 |
| 2019/0255887 A1* | 8/2019 | Perrin ....................... B60C 9/18 |

* cited by examiner

TIRE TREAD AND A TIRE COMPRISING A TREAD

This application claims benefit of U.S. Provisional Patent Application Ser. No. 62/887,174, filed on Aug. 15, 2019. The teachings of U.S. Provisional Patent Application Ser. No. 62/887,174 are incorporated herein by reference in their entirety.

FIELD OF THE INVENTION

The present invention is directed to a tire tread and a tire comprising a tread.

BACKGROUND

Pneumatic tires include treads having a considerable influence on a plurality of properties of the tire, including for instance rolling resistance, wet grip and noise. One source of increased rolling resistance is the deformation of the tread in the area of the tread grooves and adjacent tread blocks or ribs which results in the generation of heat and consequently increases rolling resistance. The performance of the tire is impacted by such deformations as well. For instance, cornering stiffness is limited. In order to overcome such deficiencies, multiple ways of improving groove stiffness have been suggested in the prior art.

U.S. Pat. No. 8,919,404 B2 discloses tire groove reinforcements which extend in a circumferential direction along the tread grooves. In particular, such reinforcements comprise a compound which is relatively stiff compared to the compound which is provided in the tread ribs and laterally outer tread of the tire. U.S. Pat. No. 8,919,404 B2 more specifically discloses a rubber composition for groove reinforcement in a tread for a tire comprising: at least one rubber component; between about 50 phr and 120 phr of a filler, wherein at least 20 phr of the filler is a high surface area carbon black wherein the high surface area carbon black has an iodine adsorption number of at least 100 g/kg; and between 10 phr and 30 phr of a phenolic resin; and wherein the tread has a tread rubber composition for road contact and the rubber composition for groove reinforcement is a different composition located adjacent a groove, covering at least a groove bottom, but not extending to the unworn surface of the tread, the rubber composition for the groove reinforcement having a shore A hardness of greater than 80 and an elongation at break more than 300 percent, and wherein the groove reinforcement has two radially extending portions forming at least partially opposing sidewalls, the adjacent groove and a radially inner base which is in direct contact with a supporting structure arranged under the tread forming distinct reinforcement areas with respect to the lateral direction.

U.S. Pat. No. 9,623,707 B2 further discloses groove reinforcements which can be asymmetric oriented with respect to the center of the groove reinforced. U.S. Pat. No. 9,623,707 B2 more specifically reveals a tire comprising a tread comprising: a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove; wherein the groove reinforcement consists of a rubber composition, the rubber composition comprising: between about 50 phr and 120 phr of a filler, wherein at least 20 phr of the filler is a high surface area carbon black having an iodine adsorption number of at least 100 g/kg; and between 10 phr and 30 phr of a phenolic resin. U.S. Pat. No. 9,623,707 B2 further indicates that at least one groove reinforcement can be an asymmetric groove reinforcement which extends in the radial direction to form at least part of at least one sidewall of the adjacent groove, a part of the asymmetric groove reinforcement on one sidewall extending radially further than any part of the asymmetric groove reinforcement on the other sidewall. Such a tread can further a radially innermost tread base, where each groove reinforcement extends from the radially outer surface of the tread base in a radially outward direction at least to the bottom of the adjacent circumferential groove to form at least part of the bottom of that groove.

U.S. Pat. No. 10,427,463 B2 discloses groove reinforcements which also extend in an axial direction over multiple grooves such that the groove reinforcements of the circumferential grooves are integrally connected to one another in an axial direction. The tread intended to contact pavement or a road surface is made of a softer compound than the reinforcement. U.S. Pat. No. 10,427,463 B2 more specifically reveals a pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove; wherein the first rubber compound comprises 100 parts by weight of at least one diene based elastomer, and from 1 phr to 150 phr of silica; and wherein the second rubber compound comprises a diene base elastomer, from 50 phr to 120 phr of a filler, wherein at least 20 phr of the filler is a high surface area carbon black having an iodine adsorption number of at least 100 g/kg, from 1 phr to 45 phr of a methylene acceptor, from 1 phr to 25 phr of a methylene donor, and from 1 phr to 30 phr of at least one additive selected from the group consisting of carbamic resins, liquid diene based polymers having a number average molecular weight ranging from 1000 to 25000, and aromatic hydrocarbon resins.

United States Patent Application Publication No. 2010/0154948 A1 discloses a tire tread with groove reinforcement comprising fibers which is basically a lining material within the groove. However, fiber material may be difficult to mix homogeneously into the composition. Inhomogeneities may result in areas of too high fiber concentration which may increase the probability of groove cracks. Moreover, fibers may impair recycling of unused rubber compound as fibers might end up in compounds which shall not include fibers if the new use is not limited accordingly. United States Patent Application Publication No. 2010/0154948 A1 more specifically reveals a tire having an axis of rotation, the tire comprising: two sidewalls extending radially outward; and a tread disposed radially outward of the two sidewalls and interconnecting the two sidewalls, the tread comprising a main portion comprising a first compound and a reinforcing structure comprising a second compound having reinforcing short fibers oriented between −20° to +20° to a circumferential direction of the tread, the main portion of the tread comprising at least one circumferential groove separating circumferential ribs, each circumferential groove having two sides and a base therebetween, the reinforcing structure comprising a layer of the second compound secured to the sides of each circumferential groove.

These prior art approaches focus on influencing the tire's performance or properties essentially by modifying the properties of the outer tread layer and groove reinforcements. While such approaches may have provided some benefit over earlier designs, still room for improvement remains.

SUMMARY OF THE INVENTION

A first object of the invention may be to provide an advanced tire tread.

A second object of the invention may be to provide an advanced balance between cornering stiffness and rolling resistance of a tire tread or tire.

In a first aspect of the invention, a tire tread is provided, wherein the tread has a tread cap comprising at least one tread cap rubber compound for contacting the road when driving, as well as at least three circumferential grooves. At least portions of the sidewalls and the bottom of each of said grooves are formed (or encased) by a circumferential groove reinforcement, and wherein a first groove reinforcement of a groove laterally (or axially) next to the equatorial plane of the tire (or the centerline of the tread) comprises a first reinforcement rubber compound which has a higher hardness than the tread cap rubber compound, and wherein a second groove reinforcement of a groove with a larger lateral (or axial) distance to the equatorial plane of the tire (or the centerline of the tread) than the first groove, comprises a second reinforcement rubber compound which has a higher hardness than the tread cap rubber compound and a lower hardness than the first reinforcement rubber compound.

Such an arrangement of compounds can help to improve the balance between cornering stiffness and rolling resistance of the tire. In particular, by providing stiff areas around the center grooves and less stiff areas at laterally outer grooves, such balance may be improved. In the shoulder areas of the tire (which are typically free of circumferential grooves), the tread cap compound has less hardness than the reinforced areas.

In an embodiment, the first reinforcement rubber compound has a Shore A hardness from 75 to 100, optionally from 80 to 100, and the Shore A hardness of the second reinforcement rubber compound is from 60 to 90, optionally from 65 and 85, or even from 65 to 80. Such a cascade of hardnesses has been found to be most desirable. Compounds having such properties are commercially available and are well known to the person skilled in the rubber art.

In another embodiment, the tread cap rubber compound has a Shore A hardness which is within the range of 40 to 75, and which is optionally with the range of 45 to 70.

In another embodiment, the Shore A hardness of the second reinforcement rubber compound is at least 5% (optionally at least 10%) lower than the Shore A hardness of the first reinforcement rubber compound and/or the Shore A hardness of the tread cap rubber compound is at least 5% (optionally at least 10%) lower than the Shore A hardness of the second groove reinforcement rubber compound. Alternatively, or additionally, Shore A hardness of the tread cap rubber compound is at most 30% lower than the Shore A hardness of the second reinforcement rubber compound and the Shore A hardness of the second reinforcement rubber compound is at most 25% (optionally at most 20%) lower than the Shore A hardness of the first reinforcement rubber compound.

In still another embodiment, at least one of the groove reinforcements comprises two groove sidewall layers, with each sidewall layer extending from the outermost radial surface of the unworn tread down into the direction of the bottom of the groove formed by the groove reinforcement. Such a configuration with sidewall layers extending from the radially outermost area down into the direction of the groove bottom and thereby completely encasing the groove may have the advantage of avoiding smearing of other compounds of the tread cap into the groove which could be an initiator of groove cracks.

In still another embodiment, at least one of the groove reinforcements has two groove sidewall layers, each sidewall layer extending from the outermost radial surface of the unworn tread down into the direction of the bottom of the groove formed by the groove reinforcement, and wherein each sidewall layer has a uniform (or constant) thickness along its length (or in other words radial height). The feature of a uniform thickness can help to maintain the properties of the tread during tread wear. But also the reinforcement properties can be more balanced in such a configuration. Uniform thickness shall be understood herein as uniform within the boundaries of manufacturing accuracy.

In still another embodiment, at least one of the groove reinforcements has a groove support portion forming a bottom portion of the groove and having a radially inner base side as well as a radially outer top side, wherein the groove support portion tapers from its base side to its top side and has optionally an essentially trapezoidal shape tapering from the base side to the top side. In such embodiments, the groove reinforcement or encasement is anchored better in the tread radially below the groove and is also better supported by the areas below the groove. Such an arrangement can further improve cornering stiffness of the tread and the tire. The groove support portion may have convex, concave or straight lateral sides.

In yet another embodiment, at least one groove reinforcement comprising the first reinforcement rubber compound is embedded in a groove reinforcement comprising the second reinforcement rubber compound, wherein the groove reinforcement comprising the second reinforcement rubber compound extends laterally below multiple grooves from one side of the equatorial plane of the tire to the other side of the equatorial plane of the tire. In other words, a groove reinforcement may extend over the lateral width of multiple grooves below the grooves and/or it is possible that one reinforcement is embedded in another groove reinforcement. In particular, a groove reinforcement reinforcing a groove closer to the equatorial plane of the tire than at least another groove reinforced by a second reinforcement, may be supported by or embedded in the second groove reinforcement. Thus, the second groove reinforcement may extend over a larger lateral width than the first groove reinforcement. Such features may for instance help to further improve cornering stiffness distribution.

In still another embodiment, at least one of the groove reinforcements has two groove sidewall layers, each sidewall layer extending from the outermost radial surface of the unworn tread (or the surface contacting the road when driving) down into the direction of the bottom of the groove formed by the groove reinforcement, and wherein each sidewall layer has, along its length, a uniform thickness from 0.5 mm to 4 mm, optionally from 0.5 mm to 2 mm.

In yet another embodiment, the groove sidewall layers having uniform thickness extend from the top of the unworn tread at least over 70% of the depth of the groove measured in parallel to the sidewall of the groove.

In still another embodiment, a ratio between thickness of the sidewall layer and length of the sidewall layer having uniform thickness is at most 1:10, optionally at most 1:15.

In still another embodiment, both groove sidewall layers have at least one of the same uniform thickness and the same length when the tread is unworn.

In still another embodiment, the tread (and/or a tire comprising the tread) has an axially innermost side and an axially outermost side and the sidewall layers of (preferably at least two or three) reinforced grooves are thicker on an axially outer side of the groove compared to an axially inner side of the same groove. Such an arrangement can help to improve further the cornering stiffness and/or behavior of the tread. The thickness of each sidewall layer as such can still have uniform thickness; it may just be different for the two different sides of the groove.

In still another embodiment, the tread (and/or a tire comprising the tread) has an axially innermost side and an axially outermost side, wherein the sidewall layers of one or two axially outermost circumferential grooves are thicker than of another groove axially closer to the innermost side of the tread or tire. Such an arrangement can also help to improve further the cornering stiffness and/or behavior of the tread.

In still another embodiment, the length (or radial height) of a first sidewall layer of the groove which is further away from the equatorial plane of the tire is smaller than that of a second sidewall layer of the same groove (which is closer to the equatorial plane of the tire). This feature may further help to balance the properties of the tire.

The term equatorial plane of the tire may also be replaced with centerline of the tread or tire herein for the sake of reference purposes.

In another embodiment, the tread comprises also a tread base layer arranged radially below the tread cap, wherein at least one of the reinforcements extends in the radial direction at least to the radially outer surface of the base layer, and optionally radially through the base layer. This may for instance help to provide a conductive passage through the tire, in particular if the tread cap compound is not sufficiently electrically conducting, such as in cases where it is filled essentially with reinforcing silica. For instance, the reinforcement may have a carbon black content of at least 40 phr so as to provide electrical conductivity through the tread.

In another embodiment, the first groove reinforcement has an elongation at break of at least 300%. Such a property can be desirable to improve crack resistance.

In another embodiment, ribs formed between the sidewalls of adjacent groove reinforcements comprise a first tread cap compound with higher hysteresis than the first and second reinforcement compounds, and optionally also higher than the tread cap compound (e.g. in the shoulder areas of the tire and/or contacting the road when driving). This can further improve the balance between rolling resistance and cornering stiffness. In particular, rolling resistance is largely affected by compound hysteresis in the shoulder regions of the tread while cornering stiffness is considerably affected by the compound stiffness in the center of the tread.

In another embodiment, ribs formed between the sidewalls of adjacent groove reinforcements comprise a first tread cap compound with lower hysteresis than the first and second reinforcement compounds.

In still another embodiment, the tread cap comprises two tread cap compound layers arranged radially on top of each other such that a first tread cap compound will contact the road when the tire is unworn and the second tread cap compound contacts the road upon wear of the first tread cap compound layer. For instance, a radially inner tread cap layer may have a compound having lower rolling resistance than a radially outer tread cap layer, while a radially outer layer may have a compound with better wet grip than a radially inner layer.

In an embodiment, one or more of the rubber compositions may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized styrene-butadiene rubber (SBR), high cis-1,4-polybutadiene rubber (PBR), isoprene-butadiene rubber (IBR) and styrene-isoprene-butadiene rubber (SIBR). These rubbers can also optionally be silicon-coupled or tin-coupled star-branched polymers. The preferred rubbers or elastomers are generally natural rubber, synthetic polyisoprene rubber, polybutadiene rubber, and styrene-butadiene rubber (SBR), including SBR made by emulsion polymerization (ESBR) and SBR made by solution polymerization (SSBR).

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. In another embodiment solution polymerization prepared SBR (S-SBR) may be used. Such an S-SBR may for instance have a bound styrene content in a range of 5 to 50, preferably 9 to 36, percent. The SSBR can be conveniently prepared, for example, by anionic polymerization in an inert organic solvent. More specifically, the SSBR can be synthesized by copolymerizing styrene and 1,3- butadiene monomer in a hydrocarbon solvent utilizing a organo-lithium compound as the initiator.

In one embodiment, a synthetic or natural polyisoprene rubber may be used. Synthetic cis 1,4-polyisoprene and cis 1,4-polyisoprene natural rubber are as such well known to those having skill in the rubber art. In particular, the cis 1,4-content may be at least 90%, optionally at least 95%. In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature (Tg) in a range of −95° C. to −105° C. Suitable polybutadiene rubbers which are available commercially from The Goodyear Tire & Rubber Company include Budene® 1207 high cis-1,4-polybutadiene rubber, Budene® 1208 high cis-1,4-polybutadiene rubber, and Budene® 1280 high cis-1,4-polybutadiene rubber. These high cis-1,4-polybutadiene rubbers can be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646. The teachings of U.S. Pat. Nos. 5,698,643 and 5,451,646 are incorporated herein by reference.

A reference to a glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer." In general, a composition comprises 100 parts of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr of one or more additional diene-based rubbers, such as SBR, SSBR, ESBR, PBD/BR, NR and/or synthetic polyisoprene. In another example, the composition may include less than 5 phr, preferably less than 3 phr of an additional diene-based rubber or be also essentially free of such an additional diene-based rubber. The terms "compound" and "composition" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance within the range of 5 phr and 120 phr, preferably within a range of 20 phr and 70 phr or within the range of 80 phr to 120 phr. Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and DBP number ranging from 34 cm$^3$/100 g to 150 cm$^3$/100 g.

In one embodiment the rubber composition may contain a conventional sulfur containing organosilicon compounds or silanes. Examples of suitable sulfur containing organosilicon compounds are of the formula:

in which Z is selected from the group consisting of

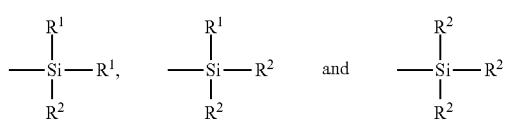

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

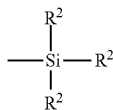

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si$ $(OCH_2CH_3)_3$, which is available commercially as NXT™ from Momentive Performance Materials. In another embodiment, suitable sulfur containing organosilicon compounds include those disclosed in U.S. Pat. No. 6,849,754 B2 of Degussa AG. In one embodiment, the sulfur containing organosilicon compound is Si-363 from Degussa AG. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 to 3 phr. Typical amounts of waxes, if used, may for example comprise 1 phr to 5 phr. Often microcrystalline waxes are used. Typical amounts of peptizers, if used, may for instance comprise 0.1 phr to 1 phr.

Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one non-productive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect of the invention, a tire is provided, the tire having a tread in accordance with one or more of the embodiments mentioned herein. Thus, the tire has a tread comprising a tread cap comprising at least one tread cap rubber compound for contacting the road when driving, at least three circumferential grooves, wherein at least portions of the sidewalls and the bottom of each of said grooves are formed by a circumferential groove reinforcement, and wherein a first groove reinforcement of a groove laterally next to the equatorial plane of the tire comprises a first reinforcement rubber compound which has a higher hardness than the tread cap rubber compound, and wherein a second groove reinforcement of a groove with a larger lateral distance to the equatorial plane of the tire than the first groove, comprises a second reinforcement rubber compound which has a higher hardness than the tread cap rubber compound and a lower hardness than the second reinforcement rubber compound.

In an embodiment, the tire has a carcass connecting two bead portions, and one or more belts arranged between the carcass and the tread in a crown area of the tire.

Advantages of the tire comprising a tread in accordance with an aspect of the invention or one of its embodiments or combinations thereof have already been indicated above.

It is emphasized that one or more embodiments, or features thereof, maybe be combined with each other within the scope of the present invention.

The tire could for example be a pneumatic tire, in particular a pneumatic radial and/or passenger car tire.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE EMBODIMENTS

Figure 1:
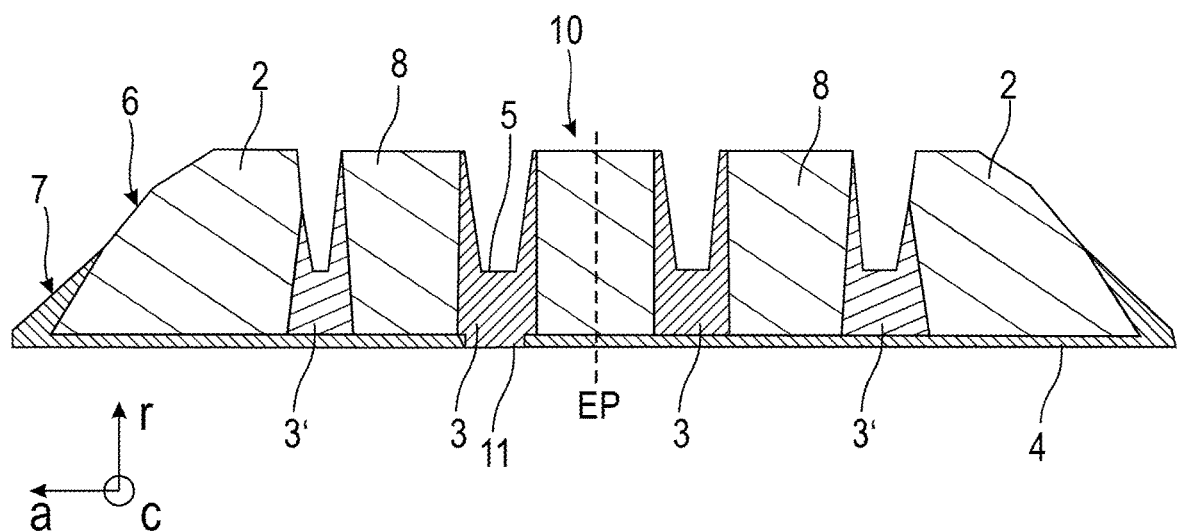
FIG. 1 represents a schematic cross section of a tire tread comprising groove reinforcement and tread cap compounds in accordance with an example of the present invention.

FIG. 1 shows a schematic cross section of a tire tread 10 in accordance with a first embodiment of the present invention, wherein the tread 10 has a tread cap 2 with a plurality of circumferential ribs and/or tread blocks 8 between circumferential (main) grooves 5. Moreover, said tread 10 has a support portion having a tread base 4. The tread base 4 or tread base layer 4, if present, is preferably made of a different compound than the cap 2 and it supports the tread cap 2 on a radially inner side of the tread 10. The tread base layer 4 also has in the present and non-limiting example radial extensions in axially outer regions 7 of the shoulder regions 6 of the tire, in other words in the skirt regions 7 of the tread 10. The grooves 5 are reinforced by a plurality of axially or laterally separated groove reinforcements 3, 3' which extend in a circumferential direction. In other words, the groove reinforcements form the bottoms of the grooves 5 as well as at least parts of their sidewalls (cover at least a portion of the sides of the grooves 5), i.e. the sidewalls of the ribs or blocks 8. The portions of the groove reinforcements covering the groove sidewalls are optionally tapered and have a decreasing thickness along their length in an outer radial direction. The groove reinforcements 3, 3' will normally cover at least about 80% of surface area of the groove sidewalls and will more typically cover at least 90% or 95% of the surface area of the groove sidewalls. In many cases, the groove reinforcements 3, 3' will totally cover the surface are of the groove sidewalls. In the embodiment of the invention depicted in FIG. 1, the outside walls of the outside grooves are only partially covered with the groove reinforcements 3' with the inside walls of the outside grooves and the walls of the inside grooves being totally covered with the groove reinforcements 3, 3'. In such an embodiment of the invention the surface area of outside walls of the outside grooves will typically be from 50% to 95%, and more typically from about 55% to 90% covered with the groove reinforcements 3'. In some cases, the surface area of outside walls of the outside grooves will be from 60% to 80% or from 60% to 70% covered with the groove reinforcements 3'.

As shown in FIG. 1, the equatorial plane EP of the tire tread is indicated by dashed lines. Alternatively, one could also refer to the center line of the tread which would run circumferentially in the equatorial plane EP. In accordance with the invention, the compound of the groove reinforcements 3 which are closest to the equatorial plane EP have a higher hardness than the compounds of the groove reinforcements 3' which are more far away from that plane. In addition, the compound in the tread cap 2 is even less hard than the compounds in the areas 3, 3'. It is contemplated herein that the tire could also have three main grooves 5 or five or more grooves 5. Furthermore, one of the groove reinforcements 3 comprises an extension 11 extending radially through the tread base layer 4. This feature may help to provide a conductive passage through the tire tread to a belt region of the tire (not shown in FIG. 1).

Figure 2:
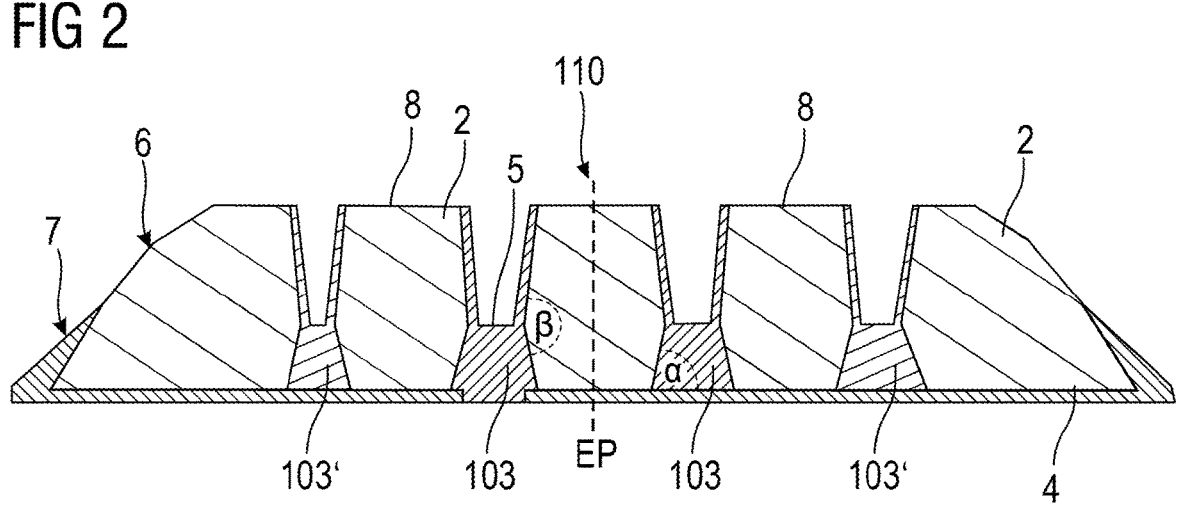
FIG. 2 represents a schematic cross section of another tire tread comprising groove reinforcement and tread cap compounds in accordance with another example of the present invention in which sidewall layers of the groove reinforcements have essentially a uniform width.

FIG. 2 shows another example of a tread 110 in accordance with the invention. The tread 110 has a tread cap 2 made of a tread cap compound, a plurality of tread blocks and/or ribs 8 largely made of tread cap compound, a shoulder portion 6, a skirt portion 7 and a plurality of circumferential tread grooves 5 which are formed in the tread cap 2 by the groove reinforcements 103, 103'. In other words, one may also say that the groove reinforcements 103, 103' are embedded in the tread cap 2. Radially below the tread cap 2, there is a tread base layer 4 supporting the radially above arranged groove reinforcements 103, 103' and tread cap 2. In contrast to the embodiment shown in FIG. 1, the embodiment of FIG. 2 has differently shaped reinforcements 103, 103'. Thus, while the compound of the two laterally innermost reinforcements 103 is harder than the compound of the two laterally outer groove reinforcements 103', as it is also the case for the embodiment of FIG. 1, the thickness of the sidewall layers of the groove reinforcements 103, 103' is constant over the height of the groove, in this example down to the bottom of the reinforced grooves. The groove reinforcements 103, 103' have below the bottom of the reinforced grooves a support portion which has a top side, in this example forming the bottom of the groove and a base side, wherein the support portion tapers from the bottom side to the top side. Both sides are interconnected at their lateral edges by the lateral sides. The lateral sides have in the example an angle α between an axial direction or the axial base side which is smaller than 90°. In other words, the groove support portion tapers from its base side to its top side or top portion. As the support portion of the groove reinforcement tapers in an outer radial direction, there may be an angle β between the lateral side of the support portion and the sidewall layer of the groove reinforcement which is smaller than 180°, preferably smaller than 175°, which may improve support of the groove. While in the example of FIG. 2 the support portion extends in an outer radial direction until the bottom of the reinforced groove, this extension could be different. According to FIG. 2, all sidewall layers of a groove and the sidewall layers of all grooves have in this example the same uniform thickness. However, it is emphasized that the sidewall layers could also have different thicknesses, while each layer as such could have still uniform thickness.

Figure 3:
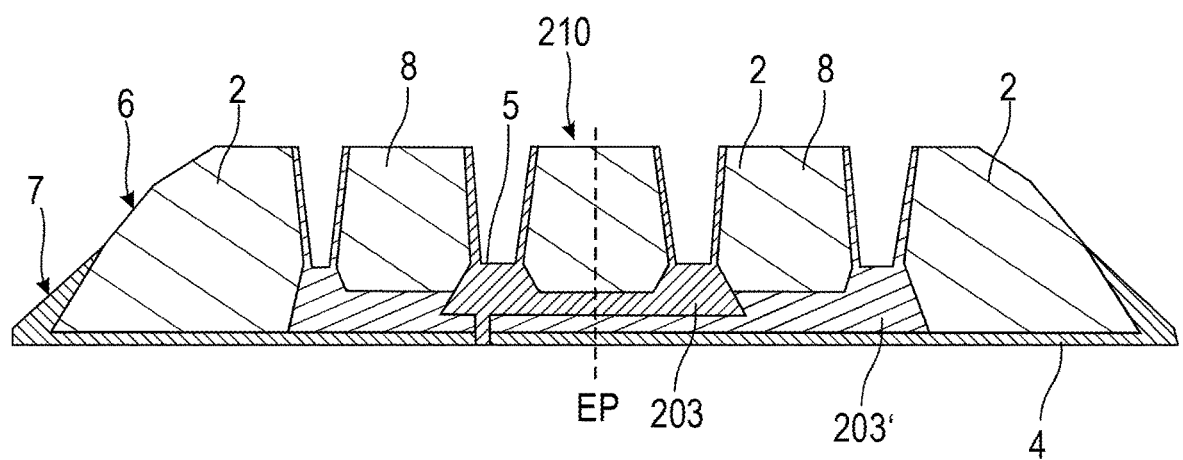
FIG. 3 represents a schematic cross section of still another tire tread comprising groove reinforcement and tread cap compounds in accordance with still another example of the present invention in which tread groove reinforcements integrally extend over the width of multiple grooves.

In the example in accordance with the present invention shown in FIG. 3, the tread 210 has a reinforcement 203 covering the two center grooves of the tire and a reinforcement 203' which extends laterally below multiple grooves 5, in this example all four grooves 5, and forms the sidewalls and the bottoms of the two axially outermost grooves 5. At the same time, the central groove reinforcement 203 is embedded in or supported by the laterally wider groove reinforcement 203'.

Figure 4:
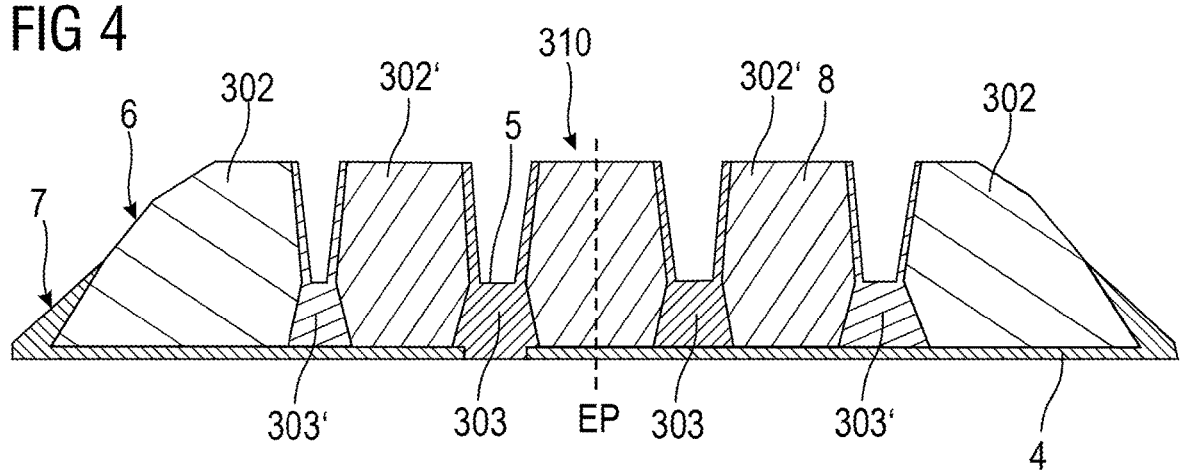
FIG. 4 represents a schematic cross section of still another tire tread comprising groove reinforcement and tread cap compounds in accordance with still another example of the present invention in which the tread cap comprises a different tread cap compound in the ribs between the grooves compared to the compound in the shoulder regions of the tread.

In another example within the scope of the present invention, the tread 310 shown in FIG. 4, has an arrangement of reinforcements 303, 303' similar to that of FIG. 2. In contrast to the embodiment described already in relation to FIG. 2, the tread cap is made of different tread cap compounds 302, 302'. In particular, shoulder regions or zones 6 of the tread cap have a first tread cap compound 302 while central regions, in particular in the ribs/tread blocks 8 (between the reinforcement sidewall layers) have a different compound 302'. For instance, the compound 302' may be optimized for wet grip compared to the tread cap compound 302 in the shoulder region 6 of the tread 310. This compound could be a low hysteresis compound compared with the tread cap compound in the ribs/tread blocks 8 of the tread 310. Apart from providing stiffness to the tread, the groove reinforcements 303, 303' avoid also that the different compounds 302, 302' are smeared into the grooves upon extrusion of the tread or the further building and curing steps.

Figure 5:
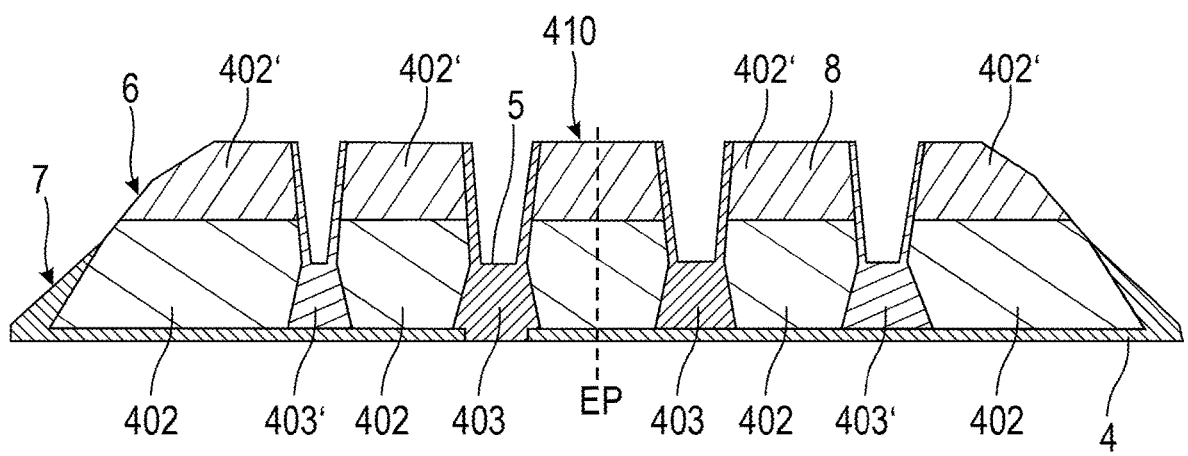
FIG. 5 represents a schematic cross section of still another tire tread comprising groove reinforcement and tread cap compounds in accordance with still another example of the present invention in which the tread cap comprises a different compound in a radially outer layer compared to a radially inner layer of the tread.

FIG. 5 shows another example of a tire tread 410 having again similar groove reinforcements 403, 403' as already discussed with regards to FIGS. 2 and 4. However, in contrast to other embodiments described herein, the embodiment of FIG. 5 has two tread cap layers arranged on top of each other. In particular, a radially lower tread cap layer has a first compound 402 while a radially upper tread cap layer has a compound 402'. Such compounds could be provided by the person skilled in the rubber art in dependency of the desired application.

While the present invention does not focus on the chemical composition of the tread compounds in the groove reinforcement, tread cap compounds or tread base layers, a few examples are given herein below. Those shall however not be understood as necessarily limiting the invention to these examples.

In this context, Table 1 provides examples of suitable base layer compounds. However, it shall be re-emphasized that the main focus of the invention is not directed to the specific compounds used.

TABLE 1

Base layer compound examples

| Sample number | i | ii | iii | iv |
|---|---|---|---|---|
| Polybutadiene | 65 | 50 | 0 | 0 |
| Natural Rubber | 35 | 50 | 100 | 100 |
| Carbon Black | 50 | 45 | 0 | 0 |
| Pre-Silanized Silica[1] | 0 | 0 | 30 | 30 |
| Phenol Formaldehyde resins | 3 | 0 | 5 | 5 |
| TDAE Oil | 11.3 | 16 | 10 | 45 |
| Waxes | 2 | 1.5 | 3.8 | 3.8 |
| Antidegradants | 7 | 5.5 | 6.7 | 6.7 |
| Stearic Acid | 1 | 0.75 | 1 | 1 |
| Sulfenamide Accelerator | 0.6 | 1.4 | 0.9 | 0.9 |
| Zinc oxide | 3.5 | 2 | 2 | 2 |
| Sulfur | 2.8 | 1.9 | 2.5 | 2.5 |

[1]Agilon 400 ® pre-silanized silica from PPG Industries.

Table 2 shows the Shore A hardness values of the samples shown above in Table 1.

TABLE 2

Base layer compound examples

| Sample number | i | ii | iii | iv |
|---|---|---|---|---|
| Shore A Hardness [a] | 49 | 54 | 29 | 17 |

[a] Shore A hardness was measured according to ASTM D2240.

Table 3 gives examples of suitable tread cap compounds. As mentioned already in the context of tread base layer compounds, it is emphasized again that such tread cap compounds mentioned herein are essentially considered as examples while other tread cap compounds could be used as long as they fall within the scope of the present invention.

TABLE 3

Tread cap compound examples

| Sample number | v | vi | vii |
|---|---|---|---|
| Functionalized SSBR[1] | 60 | 49 | 0 |
| Natural Rubber | 40 | 21 | 60 |
| ESBR[2] | 0 | 0 | 40 |
| Non-functionalized SSBR[3] | 0 | 30 | 0 |
| Tackifier Resin[4] | 0 | 0 | 6 |
| Carbon Black | 3 | 1 | 0 |
| Silica | 80 | 66 | 30 |
| Oils | 16 | 12 | 0 |
| Waxes | 1.5 | 2 | 1.5 |
| Fatty Acid Soap | 0 | 0 | 2 |
| Silane | 6.4 | 5.2 | 5 |
| Fatty Acid | 0 | 0 | 3 |
| Antidegradants | 3.5 | 0 | 3.5 |
| Stearic Acid | 2 | 4 | 0 |
| Sulfenamide Accelerator | 2.4 | 2.4 | 3 |
| Dithiophosphate Zinc Salt | 0.8 | 0.8 | 0 |

TABLE 3-continued

| Tread cap compound examples | | | |
|---|---|---|---|
| Sample number | v | vi | vii |
| Zinc oxide | 3 | 3 | 3 |
| Sulfur | 1.5 | 1.5 | 1.2 |
| Diphenylguanidine | 0 | 0 | 1.5 |

[1]Thio-functionalized, tin coupled, solution polymerized copolymer of butadiene and styrene
[2]Emulsion Styrene Butadiene Rubber, 50.8% (by weight) styrene, 8.2% vinyl 1,2; 4.2% cis 1,4; 36.8% trans 1,4; Tg (inflection) = −13° C.; 1% styrene sequences ≥5; from The Goodyear Tire & Rubber Co.
[3]Non-functionalized, solution polymerized copolymer of butadiene and styrene
[4]unreactive alkylphenol/formaldehyde resin, as SP 1068 from SI Group Table 4 shows Shore A hardness values of the example compositions of Table 3.

TABLE 4

| Tread cap compound examples | | | |
|---|---|---|---|
| Sample number | v | vi | vii |
| Shore A Hardness [a] | 67 | 55 | 60 |

[a] Shore A hardness was measured according to ASTM D2240.

Examples for suitable groove reinforcement rubber compounds may for instance be found in U.S. Pat. No. 10,427,463 B2 (also see United States Patent Publication No. 2018/0134086 A1) and note in particular in Examples 1, 2, 3, 4 and 5. Such compounds have high Shore A hardness covered by the ranges of the present disclosure. For the sake of illustration, two of the examples of that publication are listed herein below in Tables 5 to 8. The teachings of U.S. Pat. No. 10,427,463 B2 and United States Patent Application Publication No. 2018/0134086 A1 are incorporated herein by reference for the purpose of teaching rubber formulations which are suitable in the practice of this invention as groove reinforcement materials.

TABLE 5

| Groove reinforcement compounds | | | | |
|---|---|---|---|---|
| Sample number | 1 | 2 | 3 | 4 |
| polybutadiene | 10 | 10 | 10 | 10 |
| styrene-butadiene copolymer (oil extended) | 97.5 | 97.5 | 97.5 | 97.5 |
| carbon black | 50 | 50 | 50 | 50 |
| silica | 20 | 20 | 20 | 20 |
| silane | 2 | 2 | 2 | 2 |
| phenol-formaldehyde resin[1] | 20 | 20 | 20 | 20 |
| hexamethylene tetramine | 3 | 3 | 3 | 3 |
| styrene-alpha methyl styrene resin[2] | 8 | 12 | 16 | 8 |
| carbamic resin[3] | 0 | 0 | 0 | 4 |
| wax | 1.5 | 1.5 | 1.5 | 1.5 |
| antioxidants | 3 | 3 | 3 | 3 |
| stearic acid | 3 | 3 | 3 | 3 |
| processing aid | 2 | 2 | 2 | 2 |
| zinc oxide | 2.5 | 2.5 | 2.5 | 2.5 |
| sulfur | 1.6 | 1.6 | 1.6 | 1.6 |
| N-tertbutyl-2benzothiazolesulfenamide | 1.63 | 1.63 | 1.63 | 1.63 |
| N-Cyclohexylthiophthalimide | 0.3 | 0.3 | 0.3 | 0.3 |

[1]SMD 30207 from Schenectedy Chemicals
[2]Resin 2336 from Eastman
[3]Alnovol ® UF410, from Allnex Table 6 shows high Shore A hardness values above 80 as well as considerable elongation at break values over 300% for the compounds 1 to 4 of Table 5.

TABLE 6

| Groove reinforcement compounds | | | | |
|---|---|---|---|---|
| Sample number | 1 | 2 | 3 | 4 |
| Shore A [a] | 83.3 | 81.8 | 83 | 85.6 |
| Elongation at break (%) [b] | 329 | 359 | 390 | 426 |

[a] Shore A hardness measured according to ASTM D2240.
[b] Ring sample test based on ASTM D412 and DIN 53504.

In view of the relatively high Shore A Hardness such compounds would be preferably suitable for the first reinforcement compound described herein.

Table 7 lists further examples of potential compounds that could be used as groove reinforcement rubber compounds.

TABLE 7

| Groove reinforcement compounds continued | | | | | |
|---|---|---|---|---|---|
| Sample number | 5 | 6 | 7 | 8 | 9 |
| Polybutadiene | 20 | 20 | 20 | 20 | 20 |
| Natural Rubber | 80 | 80 | 80 | 80 | 80 |
| Carbon Black | 50 | 50 | 50 | 50 | 50 |
| Waxes | 1.5 | 1.5 | 1.5 | 1.5 | 1.5 |
| Antidegradant | 2.5 | 2.5 | 2.5 | 2.5 | 2.5 |
| Ricon 184[5] | 0 | 15 | 0 | 35 | 0 |
| Ricon 100[6] | 0 | 0 | 15 | 0 | 35 |
| Oil | 15 | 0 | 0 | 0 | 0 |
| Stearic Acid | 3 | 3 | 3 | 3 | 3 |
| Silica | 20 | 20 | 20 | 20 | 20 |
| silane disulfide | 2 | 2 | 2 | 2 | 2 |
| phenol formaldehyde resin | 20 | 20 | 20 | 20 | 20 |
| fatty acid soap | 2 | 2 | 2 | 2 | 2 |
| hexamethylenetetramine | 3 | 3 | 3 | 3 | 3 |
| Antidegradant | 0.5 | 0.5 | 0.5 | 0.5 | 0.5 |
| Sulfenamide Accelerator | 2.36 | 2.36 | 2.36 | 2.36 | 2.36 |
| zinc oxide | 2.5 | 2.5 | 2.5 | 2.5 | 2.5 |
| sulfur | 1.6 | 1.6 | 1.6 | 1.6 | 1.6 |
| vulcanization inhibitor | 0.3 | 0.3 | 0.3 | 0.3 | 0.3 |

[5]liquid styrene-butadiene, Mn = 8600
[6]liquid styrene-butadiene, Mn = 4000

Table 8 shows again high Shore A hardness values as well as considerable elongation at break values for the materials 5-9 of Table 7.

TABLE 8

| Groove reinforcement compounds continued | | | | | |
|---|---|---|---|---|---|
| Sample number | 5 | 6 | 7 | 8 | 9 |
| Shore A Hardness | 86 | 85.4 | 86.6 | 89.3 | 90.6 |
| Elongation at Break (%) | 508 | 518 | 508 | 481 | 502 |

In addition, the compound of Example v of Tables 3 and 4 could also be used as relatively soft second reinforcement rubber compound.

As visible in these examples for the groove reinforcement compounds, Shore A hardness values are higher than in the base layer compound or the tread cap compound. Moreover, elongation at Break is higher than 300% in all samples. However, this is not indispensable for the scope of the invention.

In general, the tread cap layer, the groove reinforcement and tread base layer may be extruded together to form the tread as known to the person skilled in the art of extrusion and/or tire building. In particular, gear pumps and/or triplex or quadruplex extruders could be used.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims.

In any case the above described embodiments and examples shall not be understood in a limiting sense. In particular, the features of the above embodiments may also be replaced or combined with one another.

What is claimed is:

1. A tire tread comprising:
   a tread cap comprising at least one tread cap rubber,
   at least three circumferential grooves,
   wherein at least portions of sidewalls and the bottom of each of said grooves are formed by a circumferential groove reinforcement, and wherein
   a first groove reinforcement of a groove laterally next to the equatorial plane of the tire comprises a first reinforcement rubber compound which has a higher hardness than the tread cap rubber compound, and wherein
   a second groove reinforcement of a groove with a larger lateral distance to the equatorial plane of the tire than the first groove, comprises a second reinforcement rubber compound which has a higher hardness than the tread cap rubber compound and a lower hardness than the first reinforcement rubber compound.

2. The tire tread of claim 1, wherein the first reinforcement rubber compound has a Shore A hardness which is within the range of 75 to 100 and wherein the Shore A hardness of the second reinforcement rubber compound is within the range of 60 to 90.

3. The tire tread of claim 1, wherein the tread cap rubber compound has a Shore A hardness which is within the range of 40 to 75.

4. The tire tread of claim 1, wherein at least one of the groove reinforcements comprises two groove sidewall layers, each sidewall layer extending from the outermost radial surface of the unworn tread down into the direction of the bottom of the groove formed by the groove reinforcement.

5. The tire tread of claim 1, wherein at least one of the groove reinforcements has two groove sidewall layers, each sidewall layer extending from the outermost radial surface of the unworn tread down into the direction of the bottom of the groove formed by the groove reinforcement, and wherein each sidewall layer has a uniform thickness along its length.

6. The tire tread of claim 1, wherein at least one of the groove reinforcements has a groove support portion forming a bottom portion of the groove and having a radially inner base side as well as a radially outer top side, wherein the groove support portion tapers from its base side to its top side and has optionally an essentially trapezoidal shape tapering from the base side to the top side.

7. The tire tread of claim 1, wherein at least one groove reinforcement comprising the first reinforcement rubber compound is embedded in a groove reinforcement comprising the second reinforcement rubber compound, and wherein the groove reinforcement comprising the second reinforcement rubber compound extends laterally below multiple grooves from one lateral side of the equatorial plane of the tire to the other lateral side of the equatorial plane of the tire.

8. The tire tread of claim 1, wherein at least one of the groove reinforcements has two groove sidewall layers, each sidewall layer extending from the outermost radial surface of the unworn tread down into the direction of the bottom of the groove formed by the groove reinforcement, and wherein each sidewall layer has a uniform thickness which is within the range of 0.5 mm to 4 mm along its length.

9. The tire tread of claim 1, wherein at least one of the groove reinforcements has two groove sidewall layers, each sidewall layer extending from the outermost radial surface of the unworn tread down into the direction of the bottom of the groove formed by the groove reinforcement, and wherein each sidewall layer has a uniform thickness along its length, and wherein the groove sidewall layers extend from the top of the unworn tread at least over 70% of the depth of the groove measured in parallel to the sidewall of the groove.

10. The tire tread of claim 1, wherein at least one of the groove reinforcements has two groove sidewall layers, each sidewall layer extending from the outermost radial surface of the unworn tread down into the direction of the bottom of the groove formed by the groove reinforcement, and wherein each sidewall layer has a uniform thickness along its length, and wherein a ratio between thickness of the sidewall layer and length of the sidewall layer having uniform thickness is at most 1:10.

11. The tire tread of claim 1, wherein at least one of the groove reinforcements has two groove sidewall layers, each sidewall layer extending from the outermost radial surface of the unworn tread down into the direction of the bottom of the groove formed by the groove reinforcement, and wherein each sidewall layer has a uniform thickness along its length, wherein both have at least one of the same uniform thickness and the same length when the tread is unworn.

12. The tire tread of claim 1, wherein at least one of the groove reinforcements has two groove sidewall layers, each sidewall layer extending from the bottom of the reinforced groove into the direction of the outermost surface of the tread, wherein the length of a first sidewall layer of the groove which is further away from the equatorial plane of the tire is shorter than a second sidewall layer of the same groove.

13. The tire tread of claim 1, further comprising a tread base layer arranged radially below the tread cap, wherein at least one of the reinforcements extends in the radial direction at least until the radially outer surface of the base layer, and optionally also radially through the base layer.

14. The tire tread of claim 1, further comprising a tread base arranged radially below the tread cap, wherein at least one of the reinforcements extends in the radial direction from the radially outermost top of the tread entirely through the base layer and wherein the reinforcement compound of the at least one reinforcement extending through the base layer has a carbon black content of at least 40 phr so as to provide electrical conductivity through the tread.

15. The tire tread of claim 1, wherein the first groove reinforcement has an elongation at break of at least 300%.

16. The tire tread of claim 1, wherein ribs formed between the sidewalls of adjacent groove reinforcements comprise a first tread cap compound with higher hysteresis than the first and second reinforcement compounds, and optionally higher than the remaining tread cap compound.

17. The tire tread of claim 1, wherein the tread cap comprises at least two tread cap compounds arranged radially on top of each other, including a first tread cap compound for contacting the road when the tire is unworn and a second tread cap compound for contacting the road upon wear of the first tread cap compound.

18. A tire having a tread comprising:
a tread cap comprising at least one tread cap rubber compound,
at least three circumferential grooves,
wherein at least portions of the sidewalls and the bottom of each of said grooves are formed by a circumferential groove reinforcement, and wherein
a first groove reinforcement of a groove laterally next to the equatorial plane of the tire comprises a first reinforcement rubber compound which has a higher hardness than the tread cap rubber compound, and wherein
a second groove reinforcement of a groove with a larger lateral distance to the equatorial plane of the tire than the first groove comprises a second reinforcement rubber compound which has a higher hardness than the tread cap rubber compound and a lower hardness than the first reinforcement rubber compound.

19. The tire of claim 18, wherein the tire has a carcass connecting two circumferential bead portions and one or more belts arranged between the carcass and the tread in a crown area of the tire.

20. The tire of claim 18, wherein the tire is a pneumatic tire.

* * * * *